WHITING & EDWARDS.

Fastening Tires on Wheels.

No 38,524.

Patented May 12, 1863.

Witnesses.
C. W. Whiting.
A. K. Richmond.

Inventor.
Wm C. Whiting,
H. F. Edwards.

UNITED STATES PATENT OFFICE.

WILLIAM C. WHITING AND HENRY F. EDWARDS, OF WORCESTER, MASS.

IMPROVEMENT IN FASTENING TIRES ON WHEELS.

Specification forming part of Letters Patent No. 38,524, dated May 12, 1863.

*To all whom it may concern:*

Be it known that we, WILLIAM C. WHITING and HENRY F. EDWARDS, of the city and county of Worcester, and State of Massachusetts, have invented a new and useful Mode of Fastening Tires Upon Wheels; and we hereby declare that the following is a true and exact description thereof, reference being had to the accompanying drawings, and to the letters of reference marked thereon, in which—

Figure 1:
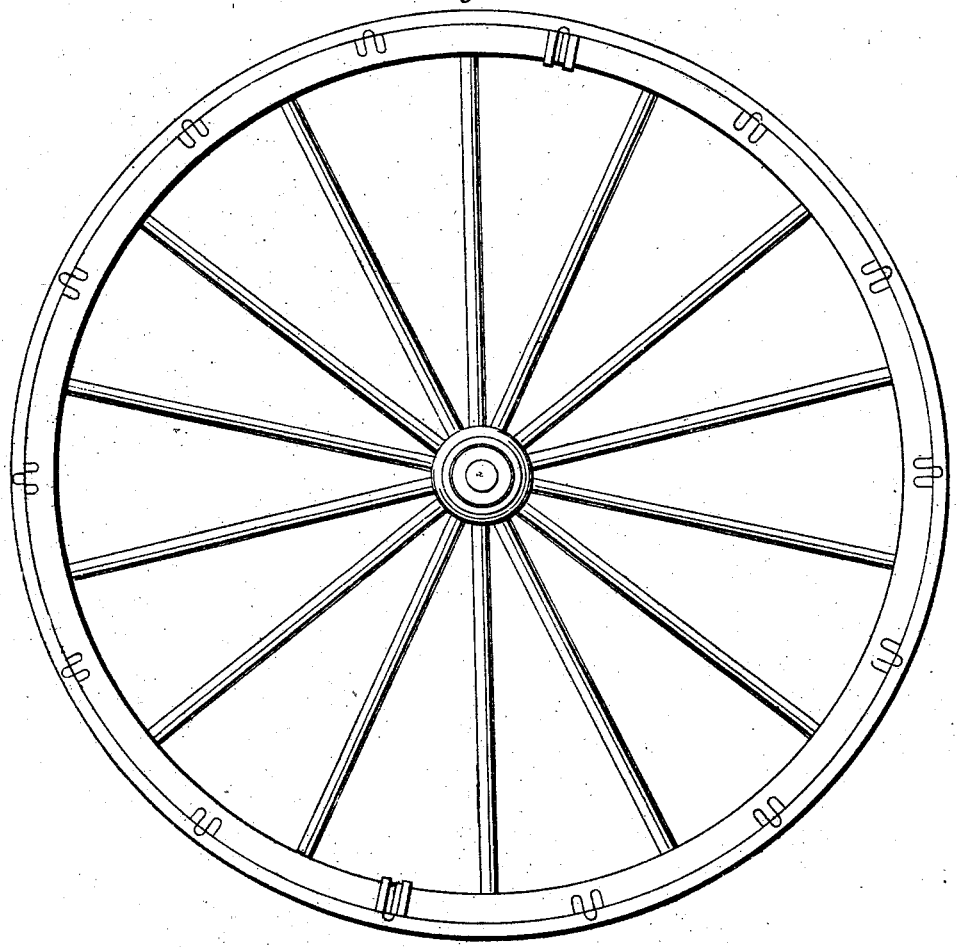
Figure 2:
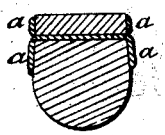
Figure 3:
Figures 4, 5:

Figure 1 shows a wheel complete. Fig. 2 shows a transverse section of a felly and tire. Fig. 3 shows the form of the tire-fastener. Fig. 4 shows another form of fastener. Fig. 5 shows the head of the last form.

The object of our invention is to confine the tire upon the wheel securely without impairing the strength of either the tire or felly by drilling or boring, and at the same time to diminish the labor and expense of thus securing them. This we accomplish by placing a metallic plate, Fig. 3, with any number of prongs *a a a* between the felly and tire, the prongs being bent alternately in opposite directions and at right angles with the plane of the plate, as seen in Fig. 2, *a a*, or this form may be varied, dispensing with the prongs at one end and substituting a head, as in Figs. 4 and 5.

The manner of applying our improvement is as follows: A sufficient depression is made in the felly to receive the metallic plate before the tire is set. After setting the tire the plate is passed through between the felly and tire, and the prongs are then bent to secure them in their position, at the same time effectually preventing the lateral movement of the tire upon the felly. By this simple process all of the drilling of the tire and boring of the felly, by which the strength of both is impaired, are dispensed with. The expense and labor of bolts is thus avoided, and equal security for the tire is obtained by this as by the old process. The labor and expense of resetting the tire are much less by this than by the old process.

Having thus described our improvement and its objects, what we claim, and desire to secure by Letters Patent, is—

A metallic plate with any number of prongs on either or both ends introduced between the tire and felly in the manner and for the purposes set forth.

WILLIAM C. WHITING.
HENRY F. EDWARDS.

Witnesses:
C. W. WHITING,
G. W. BAILEY.